No. 723,346. PATENTED MAR. 24, 1903.
F. A. WELLS, DEC'D.
W. E. WELLS, ADMINISTRATOR.
BIDET.
APPLICATION FILED OCT. 26, 1901.
NO MODEL. 2 SHEETS—SHEET 2.
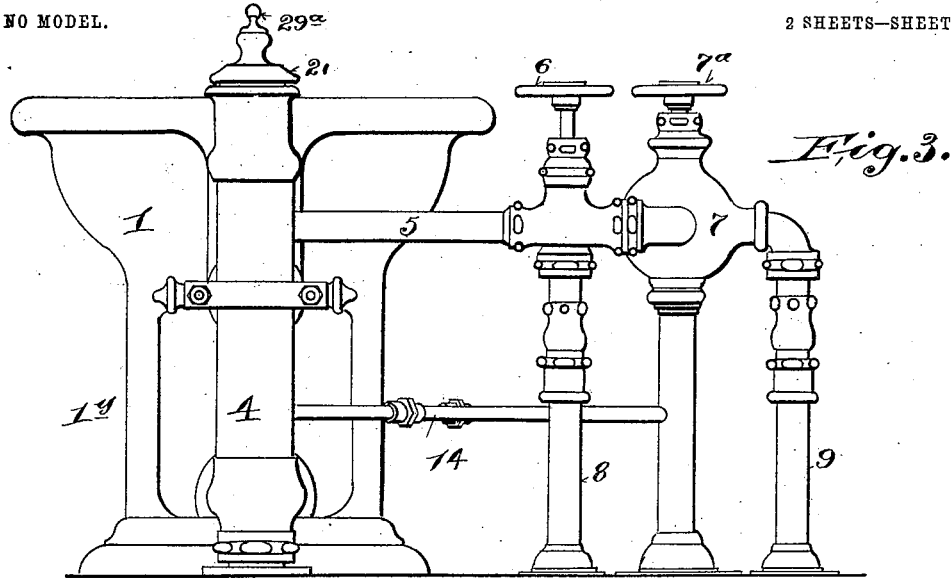
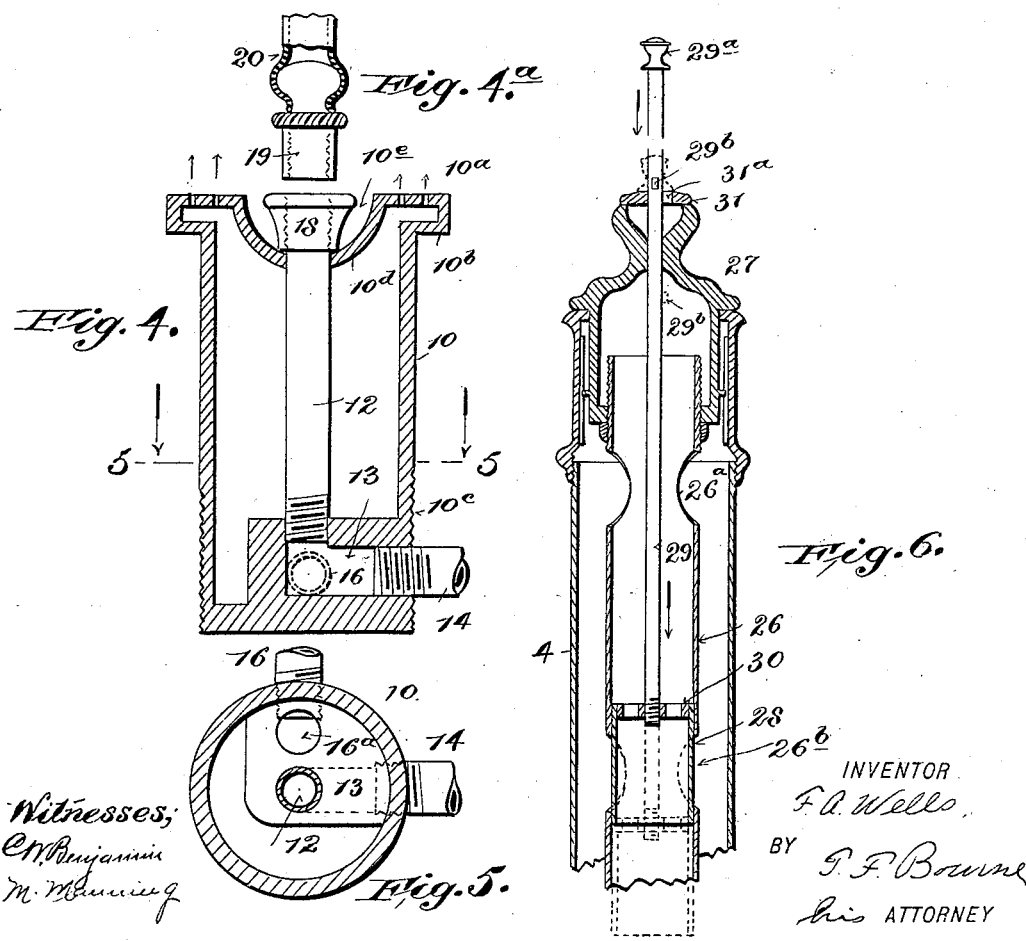
Witnesses,
C. W. Benjamin
M. Manning
INVENTOR
F. A. Wells
BY T. F. Bourne
his ATTORNEY

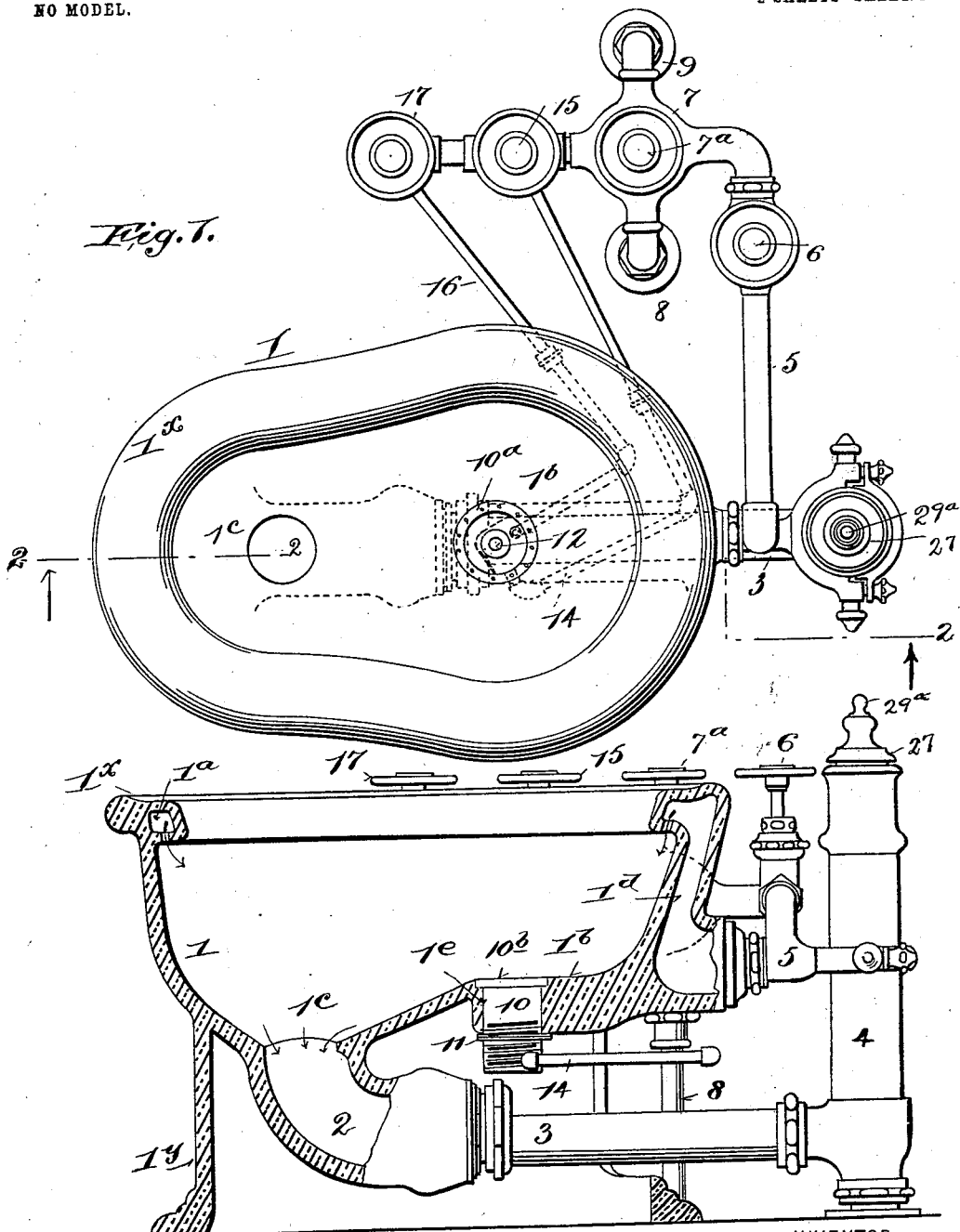

UNITED STATES PATENT OFFICE.

FRANK A. WELLS, OF NEW YORK, N. Y.; WILLIAM E. WELLS ADMINISTRATOR OF SAID FRANK A. WELLS, DECEASED.

BIDET.

SPECIFICATION forming part of Letters Patent No. 723,346, dated March 24, 1903.

Application filed October 26, 1901. Serial No. 80,064. (No model.)

*To all whom it may concern:*

Be it known that I, FRANK A. WELLS, a citizen of the United States, and a resident of New York city, borough of Manhattan, State of New York, have invented certain new and useful Improvements in Bidets, of which the following is a specification.

The object of my invention is to provide an improved bidet wherein water may be maintained at different levels for different purposes and wherein also a spray or jet of water may be directed upwardly to the top or seat portion of the bowl, a retained pool and outlet being below the spray and jet openings, and whereby also a tube and point may be connected with the water-supply within the bowl for injection or similar purposes; and to these ends my invention comprises the novel details of improvement that will be more fully hereinafter set forth and then pointed out in the claims.

Reference is to be had to the accompanying drawings, forming part hereof, wherein—

Figure 1 is a plan view of a bidet embodying my invention. Fig. 2 is a section on the line 2 2 in Fig. 1. Fig. 3 is an end elevation looking from the right in Fig. 1. Fig. 4 is an enlarged detail view of the chamber for producing the spray. Fig. $4^a$ is a detail of a coupling to be connected with a water-supply pipe. Fig. 5 is a horizontal section on the line 5 5 in Fig. 4, and Fig. 6 is an enlarged detail view of the overflow-controlling devices.

Similar numerals of reference indicate corresponding parts in the several views.

In the drawings the numeral 1 indicates the bowl of the bidet, which may be of suitable construction and shape, preferably of earthenware or fire-clay, and provided with a perforated flushing-rim $1^a$. The top edge $1^x$ of the bowl is preferably concaved slightly to provide a convenient seat for the user, and the preferred contour of the top of the bowl is shown in Fig. 1, which has an elongated substantially oval shape, gradually narrowing from the back to the front. The bowl is shown supported by a wall $1^y$ depending around the sides and front and having a rear opening.

2 is an outlet, which may be in the form of a tubular extension beneath the bowl, projecting rearwardly and connected by couplings to a waste-pipe 3, controlled by a valve in a stand-pipe 4, for maintaining water in the bowl.

The bowl, its supporting-walls, the flushing-rim, and the outlet 2 are all preferably made in a single piece of material. In front of the bottom $1^b$ of the bowl is a depression forming a water receptacle or space $1^c$, in which water may be maintained in a pool below the level of the bottom $1^b$ in position to be utilized by the hands for washing parts of the person, and the outlet 2 leads from said depression or space, as in Fig. 2. The main source of water for the bowl in the illustration I have shown is supplied through a channel $1^d$ in the wall of the bowl, which leads to the flushing-rim $1^a$, and said channel is connected by suitable couplings with a pipe 5, controlled by a suitable valve 6, connected with a source of supply. The water from the rim $1^a$ may be used to charge the bowl and for flushing it. Connections are made for hot or cold water or a mixture thereof, and for convenience in regulating the temperature of the water I provide a suitable temperature-cock 7, connected with hot and cold water supply pipes 8 9 and controlled by a valve $7^a$, and to the temperature-cock the pipe 5 is connected. From the bottom $1^b$ a spray or jet of water is to be directed upwardly within the bowl to reach a person sitting on the rim $1^x$ or over the bowl, and for these purposes I have shown said bottom provided with an opening $1^e$, in which a chamber 10 is located and which is provided with perforations $10^a$, to form a spray as water issues from said chamber. As a convenient means of construction I provide the chamber 10 with a flange $10^b$, that rests upon a corresponding countersink in the bowl, and said chamber projects below the bottom of the bowl, as shown in Fig. 2, and may be provided with exterior threads $10^c$, so as to be held in place by a nut-coupling or the like, 11. The top sprinkler and nipple plate $10^d$ is raised above the flange $10^b$, forming a space for the passage of water to the holes $10^a$.

12 is a pipe that extends vertically in chamber 10 and projects through the top plate $10^d$. The pipe 12 is shown connected with a port or channel 13, near the bottom of chamber 10, to which port or channel a supply-pipe 14 is connected, and said pipe is controlled by a valve 15, the pipe 14 being preferably connected with the temperature-cock 7. Water is led into chamber 10 from a pipe 16, and in the arrangement I have shown said pipe leads to a vertically-disposed port $16^a$, near the bottom of the chamber and opening into the latter. (See Fig. 5.) In the arrangement illustrated in Figs. 4 and 5 the bottom of chamber 10 is provided with a thick wall in which the ports 13 and $16^a$ are provided, which forms a convenient means for connecting the pipes 12, 14, and 16 with the chamber. The pipe 16 is controlled by a valve 17 and is preferably connected with the temperature-cock 7. By these means water of the desired temperature may be passed through the holes $10^a$ in chamber 10 as a spray or through the pipe 12 in the form of a stream or jet or through both simultaneously, as desired. The top of chamber 10 will preferably lie about flush with the surface of the bottom $1^b$ of the bowl and the pipe 12 should not project above said surface. To provide for connecting a rubber tube with pipe 12, the sprinkler-plate $10^d$ of the bowl is depressed or recessed at $10^e$, into which recess the upper end of pipe 12 extends, as shown in Fig. 4. Said pipe may be provided with a removable cap 18, connected therewith by screw-threads, and the arrangement is such that a coupling 19, having internal threads, may be screwed to said pipe, the coupling 19 being the ordinary coupling of a rubber tube 20, having the usual point for use in vaginal or rectal injections or for producing a needle-jet.

Means are provided for maintaining water in the bowl 1 either at a level about flush with or below the surface of bottom $1^b$ to form the pool at $1^c$ and so as not to cover the spray or jet when they are used or at a suitable height above the bottom, and as a convenient means for this purpose I have provided an outlet or overflow-valve arrangement as follows: I preferably utilize portions of the well-known secret overflow and waste comprising the stand-pipe 4, connected with the sewer, and the internal overflow-pipe 26, having the customary valve for controlling the outlet, a handle 27, and one or more lateral ports $26^a$. The port $26^a$ is to be utilized in maintaining the high level of water in bowl 1, and to maintain the low level of water therein I provide the pipe 26 with one or more ports $26^b$ below the port $26^a$, and I control the port $26^b$ by a valve 28, which in the example shown in Fig. 6 is in the form of a tube adapted to slide within the pipe 26. Said tube 28 is shown provided with an operating-rod 29, connected thereto as by means of a cross-bar or perforated disk 30, secured to the tube 28 and to said rod, and said rod extends vertically through the handle 27 and is provided with a handle or button $29^a$, whereby the tube or valve 28 can be manipulated. Means are provided for maintaining the valve 28 in the position for closing port $26^b$, and such means may consist of an extension $29^b$ on rod 29, adapted to travel through a slot $31^a$ in a cover 31 on the handle 27, whereby when the rod 29 is raised to close port $26^b$ the extension $29^b$ will pass through the slot $31^a$ and can be turned to maintain the parts, as indicated in Fig. 6. When the parts are in such position and water is passed into bowl 1, it will find a level therein, according to the height of port $26^a$. When it is desired to maintain water in the bowl at a lower level, the valve 28 will be pushed down to uncover the port $26^b$, and the latter will control such water-level. It is evident, however, that valve 28 could be lowered from above to close port $26^b$ and raised to open said port, if desired. When bowl 1 is to be emptied, the pipe 26 will be lifted in well-known manner.

When water is maintained at the high level in the bowl, the same may be used as a footbath or the like, and when the water is at the low level the user while sitting upon the rim $1^x$ can utilize the pool of water in front of him at $1^c$ with which to wash his parts. This will be found highly useful. For some diseases a spray directed upon the affected parts is advantageous, and by sitting upon the rim $1^x$ a spray from chamber 10 can be thrown at close range upon the affected parts. Also while the person is in the position stated he may project a jet directly upon himself from the pipe 12, and in either case by sliding back and forth along rim $1^x$ the user can cause the spray or jet to traverse the affected parts. By connecting the tube 20 to pipe 12 a convenient means is provided for taking an enema and for vaginal treatment while the person sits over the bowl. The outlet 2 3 is preferably made relatively large, so as to carry away excrement that might unintentionally be passed during the taking of the enema. As the various treatments can be effected while the person sits upon the bowl, it will be obvious that my invention provides a ready and convenient appliance for the various uses intended and one that is cleanly and sanitary.

It will be observed that the outlet is entirely independent of and at a distance from the spray and jet devices, so that as excrement passes from the bowl it will not pass into the water-supply.

I do not limit my invention to the various details shown and described, as they may be varied without departing from the spirit thereof.

Having described my invention, what I claim, and desire to secure by Letters Patent, is—

1. A bidet comprising a bowl having a bottom provided with means for directing water upwardly, and a depression in the bottom to form a pool of water, an outlet connected with said depression, and means for maintaining water at different levels in the bowl, and comprising means for exhausting water from the bowl, substantially as described.

2. A bidet comprising a bowl having a depending supporting-wall provided with a rear opening and a depression in the bottom to form a pool of water, an outlet extension leading from said depression, and a flushing-rim all made in a single piece of material, combined with a pipe passing through said opening in said wall and coupled to said extension, and a valve-controlled outlet connected with said pipe and provided with means for maintaining water in said bowl at different levels, substantially as described.

3. A bidet comprising a bowl having a bottom, a chamber alined therewith and having perforations, means to supply the chamber with water, a pipe passing through said chamber and within the series of perforations, the upper end of said pipe below the perforations having means for connection with a coupling for a syringe-point, and means for supplying said pipe with water independently of the supply to the spray, substantially as described.

4. A bidet comprising a bowl having a bottom, a chamber alined therewith and having a top plate provided with perforations and with a recess, a pipe leading through said top plate into said recess providing a space between said pipe and the walls of said recess to receive a coupling for a syringe-point, and means for independently supplying water to said chamber and to said pipe, substantially as described.

5. A bidet comprising a bowl, means for supplying the same with water, an outlet for the bowl, and means connected with said outlet for maintaining water in the bowl at different levels and comprising means for exhausting water from the bowl, substantially as described.

6. A bidet comprising a bowl, means for supplying the same with water, an outlet for the bowl, a stand-pipe connected with the outlet, an overflow-pipe in the stand-pipe provided with ports at different levels, and a valve to control the lower port, whereby water may be maintained at different levels in the bowl, substantially as described.

7. A bidet comprising a bowl, means for supplying the same with water, an outlet for the bowl, a stand-pipe connected with the outlet, an overflow-pipe in the stand-pipe provided with ports at different levels, a tubular valve in the overflow-pipe to control the lower port, and a rod connected with said valve and extending upwardly beyond the overflow-pipe, substantially as and for the purposes set forth.

8. An overflow-valve comprising a stand-pipe, a movable valve-controlling pipe therein, said pipe having ports at different levels, a valve to control the lower port, and means for independently operating said valve, substantially as described.

9. The combination of a bowl provided with an outlet and having an opening in its bottom, with a chamber located in said opening, said chamber having spray-holes in its cover-plate and provided beneath said holes with ports, one of said ports leading to said chamber and a pipe leading to said port, a pipe located within said chamber leading to the other port and opening through the cover-plate, a pipe connected with the last-mentioned port, and means for controlling the supply of water to said ports.

FRANK A. WELLS.

Witnesses:
   T. F. BOURNE,
   M. MANNING.